R. H. OLLEY.
PANEL BOARD.
APPLICATION FILED JULY 27, 1908.

977,123.

Patented Nov. 29, 1910.
4 SHEETS—SHEET 1.

WITNESSES:

INVENTOR:
Raymond H. Olley

R. H. OLLEY.
PANEL BOARD.
APPLICATION FILED JULY 27, 1908.

977,123.

Patented Nov. 29, 1910.

4 SHEETS—SHEET 2.

WITNESSES:
D. Gurnee
L. Thor

INVENTOR:
Raymond H. Olley
by Osgood Davis
his attys

R. H. OLLEY.
PANEL BOARD.
APPLICATION FILED JULY 27, 1908.

977,123.

Patented Nov. 29, 1910.
4 SHEETS—SHEET 3.

WITNESSES:
D. Gurnee
L. Thorn

INVENTOR:
Raymond H. Olley
by Osgood Davis
his attys

UNITED STATES PATENT OFFICE.

RAYMOND H. OLLEY, OF SYRACUSE, NEW YORK.

PANEL-BOARD.

977,123.  Specification of Letters Patent.  Patented Nov. 29, 1910.

Application filed July 27, 1908. Serial No. 445,541.

*To all whom it may concern:*

Be it known that I, RAYMOND H. OLLEY, a citizen of the United States, and resident of Syracuse, in the county of Onondaga and State of New York, have invented certain new and useful Improvements in Panel-Boards, of which the following is a specification.

This invention relates to panel boards, and consists in the construction and apparatus hereinafter described and claimed.

The purpose of the invention, among others, is to produce a panel board which may be built up from a series of different units so as to be applicable to use under substantially all the ordinary varying conditions of electrical wiring.

Figure 1:
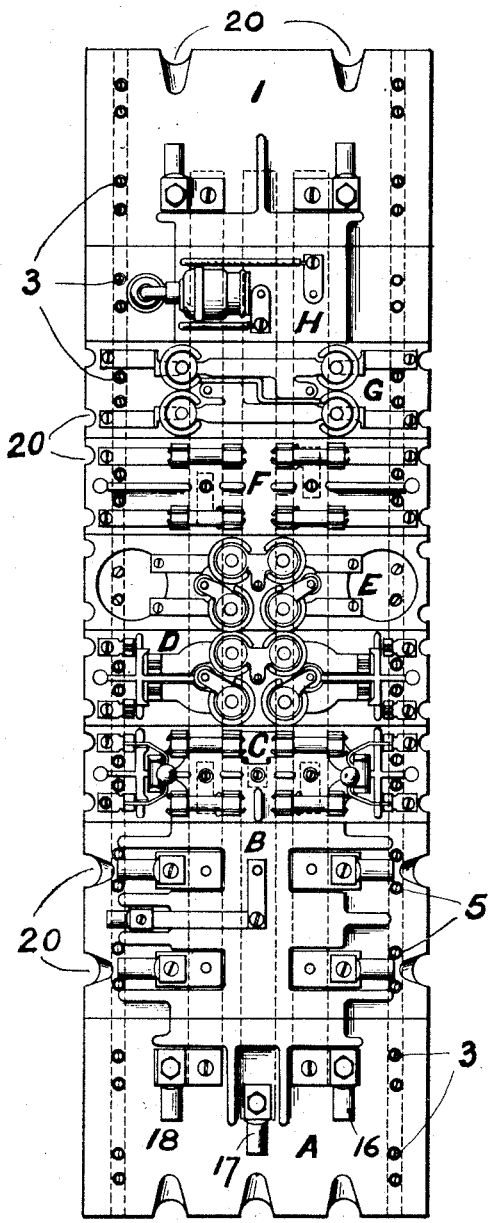
Figure 2:
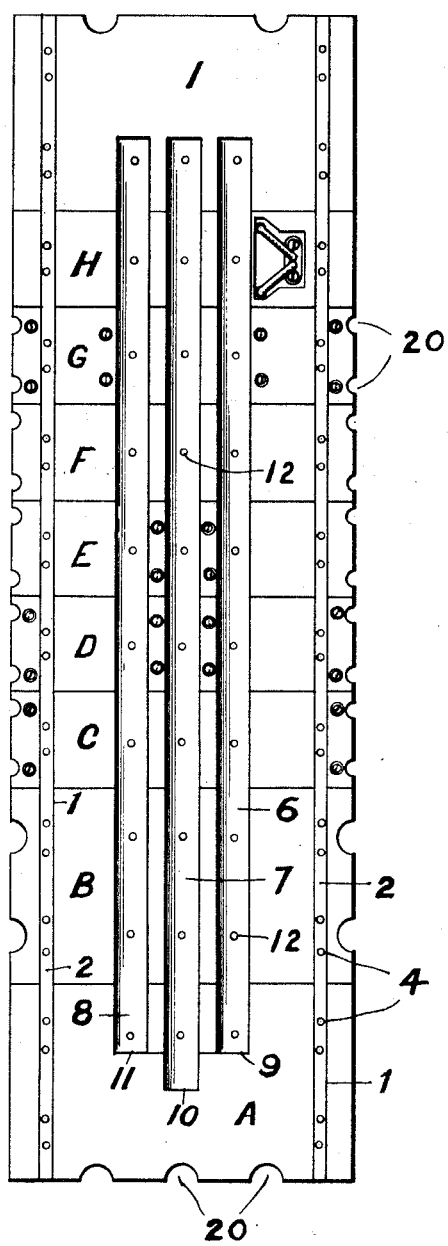
Figure 3:
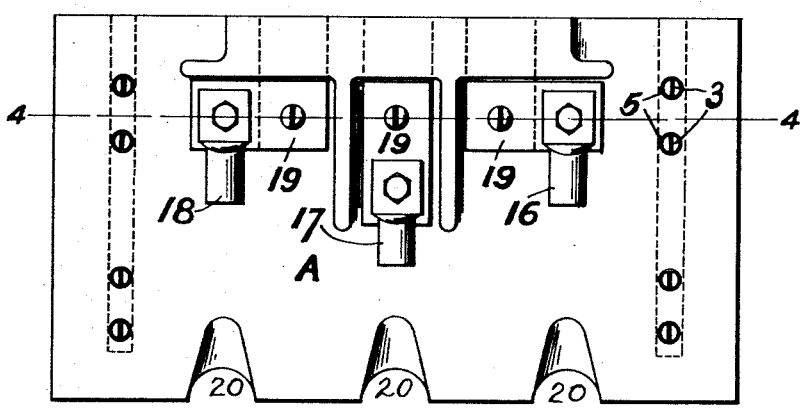
Figure 4:
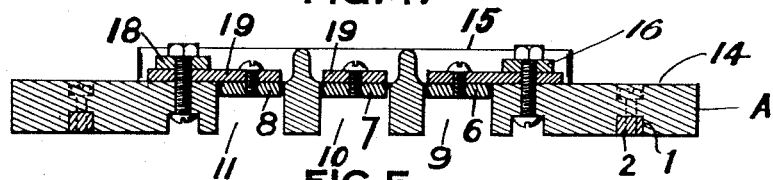
Figure 5:
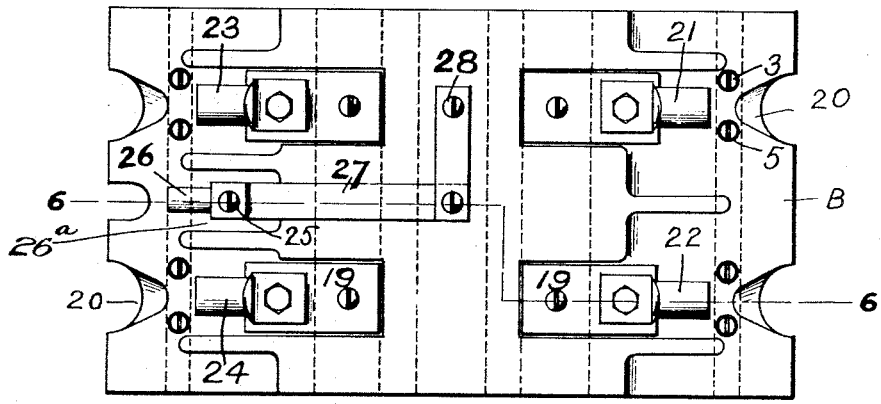
Figure 6:
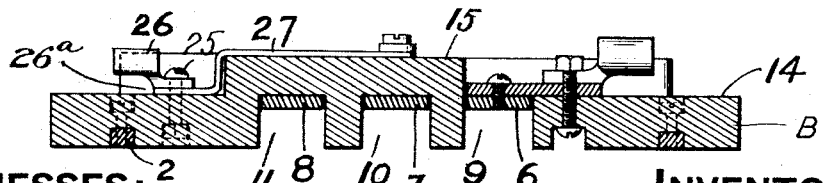
Figure 7:
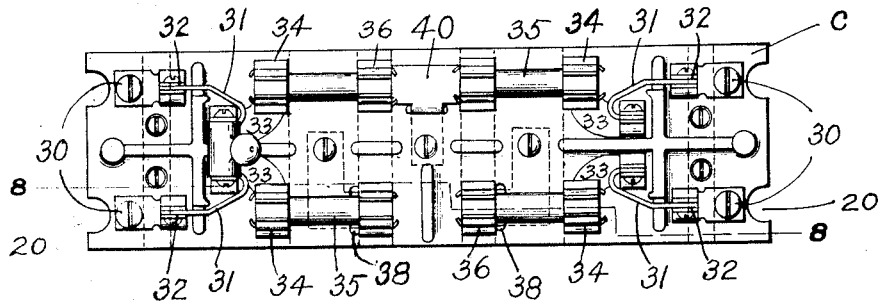
Figure 8:
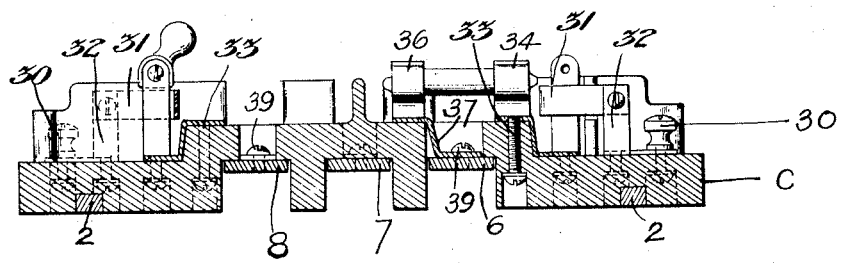
Figure 9:
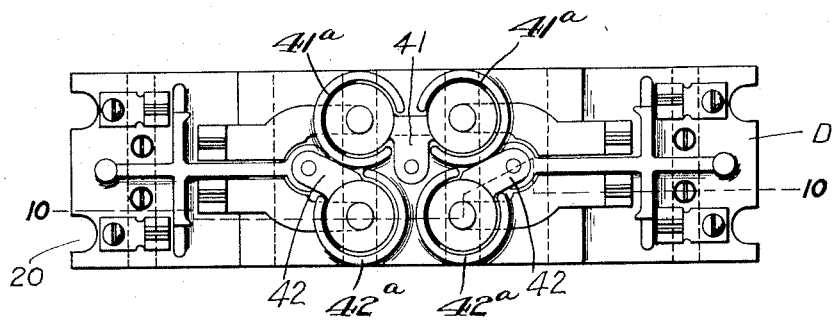
Figure 10:
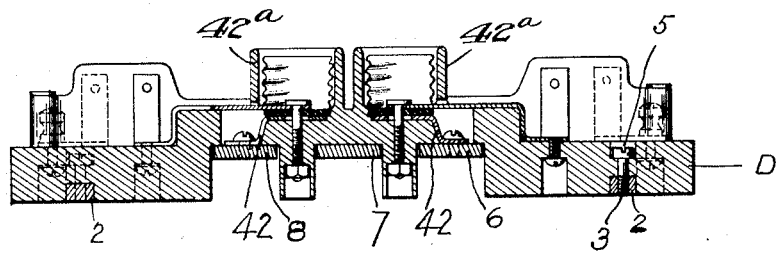
Figure 11:
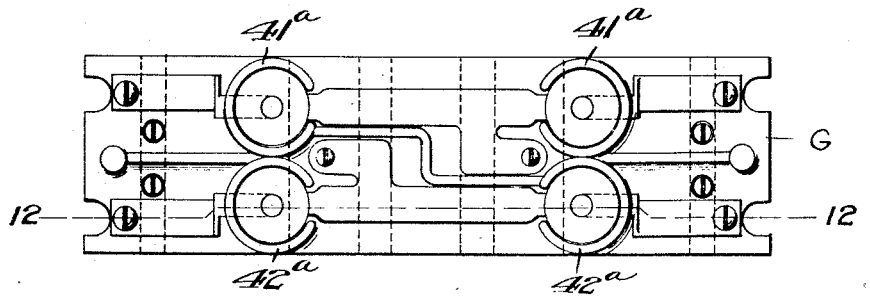
Figure 12:
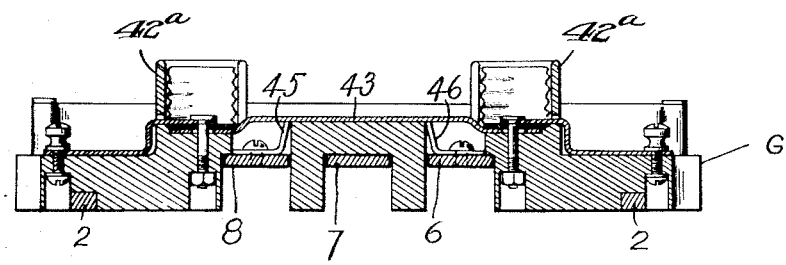
Figure 13:
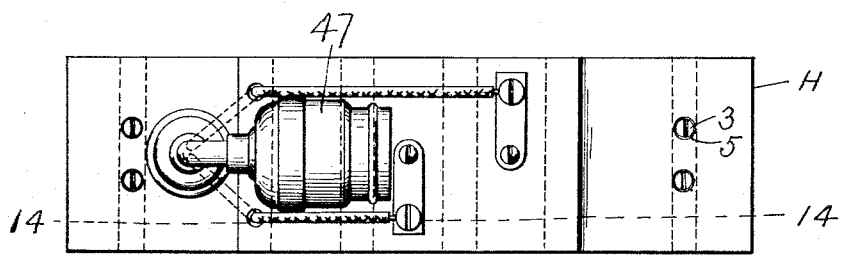
Figure 14:
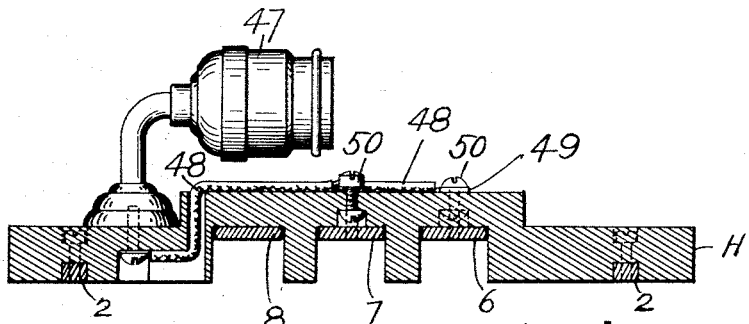

In the drawings: Figure 1 is a front elevation of a panel board, consisting of nine sections, and embodying this invention; Fig. 2 is a rear elevation of the same device; Fig. 3 is an enlarged front elevation of a main block, for a three-wire or a two-wire system, shown in Fig. 1; Fig. 4 is a cross-section on the line 4—4 of Fig. 3; Fig. 5 is an enlarged elevation of a meter-loop block; Fig. 6 is a cross-section on the line 6—6 of Fig. 5; Fig. 7 is a front elevation of a section showing on each side of the middle a knife-switch apparatus and also inclosed fuses for the circuits controlled by the knife-switches; Fig. 8 is a cross-section on the line 8—8 of Fig. 7; Fig. 9 is an enlarged front elevation of a section having four plug fuses and knife-switch apparatus at each side for controlling the lamp circuits; the switch arms being omitted in this view for clearness of illustration, but being of the same construction as shown in Figs. 7 and 8; Fig. 10 is a cross-section on the line 10—10 of Fig. 9; Fig. 11 is an enlarged front elevation of a section provided with four plug-fuse sockets, arranged somewhat differently from those shown in Figs. 9 and 10; Fig. 12 is a cross-section on the line 12—12 of Fig. 11; Fig. 13 is an enlarged front elevation of a section having a lamp socket for a pilot-light thereon; and Fig. 14 is a cross-section on the line 14—14 of Fig. 13.

In the example of this invention shown in the drawings, the panel board is composed of series of interchangeable sections A, B, C, D, E, F, G, H, I of such number as may be selected. All the sections are composed of insulating material, and preferably of porcelain. On the rear of each section, near its outer edges, is a pair of transverse grooves 1, 1, which, when the sections are in position, form a continuous longitudinal groove from end to end of the whole panel board. In each of these grooves lies a metal connecting bar 2, to which each section is fastened by screws 3 passing from the front of the panel board into tapped holes 4 in the connecting bar, and through registering perforations 5 in the sections. In the center of the back of the several sections of the panel board are a series of three registering grooves 9, 10 and 11, together forming three continuous parallel channels in the whole series of sections. These grooves contain heavy copper bars 6, 7, 8, which constitute the bus-bars for the distribution of current to the individual translating devices or circuits leading from or carried by the panel board. These channels 9, 10, and 11 are of such a depth that the upper face of each bus-bar is upon a level with the lateral portions of the front surface of each of the panel board sections, for a reason which will be described farther on.

Screw-threaded sockets 12 are arranged in the bus-bars at uniform distances apart, so that the electrical devices upon the face of the panel board may be connected to the bus-bars by screws, and the individual panel sections are so constructed that the position of the screws will register with the screw-threaded sockets in the bus-bars, and with perforations through the sections, whereby the screws may be operated from the front of the board.

The connecting bars 2, like the bus-bars, have their tapped sockets 4 arranged at uniform distances apart, and the perforations 5 through the individual panel blocks are so arranged as to register with the sockets in said connecting bars, and therefore the latter may be kept in stock in such lengths as may be desired and merely cut off for the production of a panel board of any desired size, thus standardizing the building up of the panel boards from any number of individual panel sections, and assuring that any one of the sections will fit against any other form of standard section, and may be fastened in proper position upon the connecting bars 2 and the bus-bars.

Upon the front of each panel section is a raised central portion of uniform height which provides an insulating barrier for insulation of different circuit elements from each other and from the bus-bars.

In Figs. 3 and 4 is shown a main block A, in which 14 is the lower level of the front surface, and 15 is the higher level thereof. The bus-bars 6, 7 and 8 are connected to the terminal lugs 16, 17, and 18 by short flat strap connections 19. These flat strap connections lie partly on the surface of the lower level 14 of the panel block, and partly upon the upper surface of the bus-bar, and upon the top of said strap connections are fastened the terminal lugs 16, 17 and 18 by means of bolts which lie in sockets on the back of the panel board and extend through perforations through the panel board and through the strap connections 19 and the lugs 16, 17 and 18, as the case may be. Depressions in the raised portion of the panel block down to the level of the surface 14 produce barriers of such form and arrangement as may be desired between the various circuit elements and connections.

In the edge of the section block are indentations or notches 20 of such depth as may be desired, in which lie the conductors that are attached to the lugs 16, 17 and 18. Each of these notches is opposite a particular lug, and may be beveled and rounded in such manner as to produce the least damage to the conductors.

Figs. 5 and 6 show a meter-loop block for a three-wire installation. The pairs of lugs 21 and 22, 23 and 24, are fastened respectively to the outer bus-bars 9 and 11 by means of the short strap connections, exactly as described with reference to Fig. 3, and these straps and their lugs lie in recesses or depressions in the projecting portion 15 of the panel section, which recesses extend down to the lower level 14 of the panel section. The lug 26 for the third wire of the three-wire installation is held down upon the lower level 14 of the section by a bolt 25 upon a strap 27 that is bent upward from the lower level to the upper level 15 of the section, and there is connected by a screw 28 passing through the block and into the middle bus-bar 10. A depression 26ª in the upper level 15 of the section forms suitable barriers for the lug 26 of the third wire.

In Figs. 7 and 8 are shown knife-switches in combination with fuses, the parts being duplicated and symmetrical with reference to a vertical central line in these figures. At each side of this line is a pair of fuses and a knife-switch. Each knife-switch has a pair of binding posts 30, 30. In the edge of the section, opposite each binding post, is a notch 20. A suitable cross-shaped barrier insulates the sides of the switch from each other. The knife blades 31 of the switch enter spring sockets 32, and each knife blade is connected by a strap connection 33 with a fuse support 34. This strap connection passes over the surface of the lower level 14, and upon the surface of the higher level 15.

The parts are held in place by screws lying in sockets in the rear face of the section, and pass through perforations in the section and into the part to be held. Each inclosed fuse 35 is held at one end in the fuse support 34, and in a second fuse support 36, which latter is connected with the bus-bar by a strap connection 37 which is connected with the base of the fuse support 36, passes down through a slot 38 in the raised portion of the section, and then turns downward and at right angles to its connection, and is fastened by a screw 39 with the bus-bar 6. The pair of fuse supports shown uppermost in Fig. 7 have a joint strap connection 40 with the middle bus-bar 7. This passes down through a slot, turns at right angles, and extends to the position of the standard perforation in the bus-bar. A perforation through the section registers with each perforation in the bus-bar, so that each screw may be operated from the front of the board.

In Fig. 9 is shown the block D, provided with four plug-fuse sockets, 41ª, 42ª, which are connected to the bus-bars in the same way as the fuse bars referred to in Fig. 7. The two uppermost sockets are connected to the middle bus-bar by a joint connection 41 which passes down through a slot in the upper surface of the section, turns and lies upon the face of the middle bus-bar 7. The two lower sockets are connected respectively, and in similar manner, by strap connections 42 to the outer bus-bars 6 and 8.

In Fig. 11 is shown the block G, which has two pairs of plug-fuse sockets for a two-wire distribution, in which the fuses are connected by strap connections 43 and 44, having L-shaped connectors 45, 46 passing down through slots in the surface of the section so as to lie upon the top of the outer bus-bars 6 and 8.

In Figs. 13 and 14 is shown a block H for a pilot-light on a two-wire circuit. The socket 47 is connected, by suitably insulated wires 48, with strap connections 49 by screws 50 passing through perforations in the section and extending into the bus-bars 6 and 7.

The block E in Fig. 1 is arranged for plug-fuses and snap switches. The block F is arranged for closed fuses in a two-wire system. The block I is a through-feed block for continuing the feed circuits and connecting them with other panel boards.

It will be seen in Figs. 1 and 2 that the panel board is built up from sections either of a unit width or of a width that is a multiple of the unit width. In said figures the end sections and the section next to the bottom end section are twice the width of each of the other six sections. By arranging the perforations in the sections at uniform distances apart, these perforations register, in any arrangement of the sections, with the sockets in the connecting bars and the bus-bars, so that the sections can be supplied with connecting straps extending to standard positions for registration with the sockets 12 in any arrangement of the sections.

What I claim is:—

1. In a panel board, a series of sections of insulating material consisting of front outside portions having a surface at one level and a middle projecting portion having a surface at another and a higher level, each section having grooves for bus-bars in its rear face behind the said middle portion and having recesses in the outer parts of said middle portion connecting with the bus-bar grooves, each section having notches in its edge for holding and spacing outside wires; bus-bars lying in said grooves; electrical conductors lying in the recesses; and means for fastening the bus-bars and said conductors directly together.

2. In a panel board, the combination of a series of sections of insulating material, each having registering grooves in the rear face constituting longitudinal grooves in the whole series, and a transverse recess extending inward from the edge of one section in the front face thereof, the bottoms of the grooves and the recess lying in the same plane; whereby conductors therein may be connected at said intersection, but are insulated at all other points.

3. In a panel board, the combination of a series of sections of insulating material, each being of a unit width or of a width that is a multiple of the unit width and having registering grooves in the rear face constituting longitudinal grooves in the whole series, and a transverse recess extending inward from the edge of one section in the front face thereof, the bottoms of the grooves and the recess meeting in the same plane; whereby conductors therein may be connected at said intersection, but are insulated at all other points.

4. In a panel board, the combination of a series of sections of insulating material, each having registering grooves in the rear face constituting longitudinal grooves in the whole series, and a transverse recess in the front face of one section, the bottoms of the grooves and the recess meeting in the same plane; whereby conductors in the grooves and the recess may be connected at said intersection, but are insulated at all other points.

5. In a panel board, the combination of a series of sections of insulating material, each being of a unit width or of a width that is a multiple of the unit width and having registering grooves in the rear face constituting longitudinal grooves in the whole series, and transverse grooves in the front face of one section, the bottoms of the front and rear grooves intersecting in the same plane; whereby conductors in the grooves may be connected at said intersections, but are insulated at all other points.

6. In a panel board, a section of insulating material having a bus-bar groove in its rear face and a recess in its front face joining the bus-bar groove, the bottom of the groove and the recess lying substantially in the same plane.

7. In a panel board, a section of insulating material having a central projection in its front face, a bus-bar groove in its rear face located behind said projection, and a recess in the front of the projection meeting the bus-bar groove, the bottoms of the groove and the recess lying substantially in the same plane.

RAYMOND H. OLLEY.

Witnesses:
D. GURNEE,
L. THON.